United States Patent
McCormack et al.

(10) Patent No.: US 7,570,606 B2
(45) Date of Patent: Aug. 4, 2009

(54) MANAGING A COMMUNICATIONS SYSTEM BY OFFERING PARTICIPANTS THE OPPORTUNITY TO RESPOND TO REQUESTS SUBMITTED BY OTHER PARTICIPANTS

(75) Inventors: Tony McCormack, Galway (IE); Paul D'Arcy, Galway (IE); Neil O'Connor, Galway (IE)

(73) Assignee: Nortel Networks Limited, St. Laurent, Quebec (CA)

( * ) Notice: Subject to any disclaimer, the term of this patent is extended or adjusted under 35 U.S.C. 154(b) by 568 days.

(21) Appl. No.: 11/312,977

(22) Filed: Dec. 20, 2005

(65) Prior Publication Data

US 2007/0140467 A1 Jun. 21, 2007

(51) Int. Cl.
*H04L 12/16* (2006.01)
*H04L 12/28* (2006.01)

(52) U.S. Cl. ........................... 370/260; 370/401
(58) Field of Classification Search ................. 370/254, 370/255, 260–270, 400, 401
See application file for complete search history.

(56) References Cited

U.S. PATENT DOCUMENTS

| | | | | |
|---|---|---|---|---|
| 5,610,910 A | * | 3/1997 | Focsaneanu et al. | 370/351 |
| 5,621,727 A | * | 4/1997 | Vaudreuil | 370/401 |
| 5,650,994 A | * | 7/1997 | Daley | 370/259 |
| 5,740,231 A | * | 4/1998 | Cohn et al. | 379/88.22 |
| 5,872,779 A | * | 2/1999 | Vaudreuil | 370/352 |
| 7,324,489 B1 | * | 1/2008 | Iyer | 370/338 |
| 2002/0078153 A1 | * | 6/2002 | Chung et al. | 709/204 |
| 2004/0062379 A1 | * | 4/2004 | O'Neil | 379/265.01 |
| 2007/0070980 A1 | * | 3/2007 | Phelps et al. | 370/352 |

* cited by examiner

*Primary Examiner*—Hong Cho
(74) *Attorney, Agent, or Firm*—Barnes & Thornburg LLP

(57) ABSTRACT

Participants who are in communication with a communications system can be placed in contact with one another by assigning each participant an agent profile allowing contact requests to be assigned to that participant in the capacity of an agent. One participant submits a contact request having details which can be matched against agent profiles, and that contact request is queue based on its content. A match is made between the contact request and a second participant by assigning the requests in the queue to participants whose agent profiles are matched with the queue. The second participant is thereby offered the opportunity to respond to the contact request in the capacity of an agent. It will be appreciated that rather than providing an unstructured environment (such as a free-for-all discussion forum), the method of the invention provides a way for a group of interested participants to respond to requests submitted by one another and to route such requests to a suitable and competent member of the group. In addition to allowing simple requests for information or assistance to be responded to, the method and system also has application in the context of larger environments such as online games.

16 Claims, 4 Drawing Sheets

MANAGING A COMMUNICATIONS SYSTEM BY OFFERING PARTICIPANTS THE OPPORTUNITY TO RESPOND TO REQUESTS SUBMITTED BY OTHER PARTICIPANTS

This invention relates to communications systems which enable a plurality of participants to be placed into contact with one another.

Many different systems are currently available to enable users to interact with one another and more particularly to initiate an interaction by submitting an appropriate request to a group environment. Examples include:

call centers and contact centers, which normally enable customers of an organisation to be placed in contact with one of a group of representatives of that organisation;

discussion forums which enable participants to enter into dialog with one another by means of shared message boards;

chatrooms and instant messaging groups which enable participants to message one another in real time, either in one-to-one conversations or in group discussions.

Traditionally, a contact center has two primary categories of users—agents and customers. While there are usually other categories such as supervisors, support staff, etc., it is the interaction between agents and customers which is the raison d'etre of the contact center.

It is to be understood that different contact centers will have differing terminologies for the agent and customer (the latter may, for example, be called a client, a customer, a contact, a user, etc.), nevertheless it is possible in most conventional contact centers to distinguish between the agents who form part of the contact center organisation (even when the contact center is distributed or virtual or is a dynamic amalgamation of a number of contact centers) and the customers who do not form a part of the organisation.

Agents can be considered to be those who normally are employed or contracted to act on behalf of the enterprise responsible for the contact center, while customers or clients are those who require a service of the contact center or with whom the contact center wishes to interact. (Again it is stressed that these definitions are given only for understanding and are not intended to be definitive. The truth is that the skilled person, on looking at a given contact center environment, will readily be able to tell the agents from the customers.)

Such contact centers are built on the premise that there is a supply of agents who are equipped to carry out business (in the broadest sense) with the customers.

There are other scenarios where agents are not needed but there is nevertheless a need for a group of individuals to assist one another somehow. For example, a group of classic automobile enthusiasts may set up a discussion group or a forum on the Internet in which they can post questions relating to their shared area of interest and in which they can answer such questions to the best of their abilities. Similar groups exist for almost any area of interest, from object-oriented programmers to child-minders.

In addition to a discussion group, a forum, or a mailing list, all of which can be used to distribute questions, real time discussions can be facilitated and questions can be posed and answered by dedicated chatrooms relating to an area of interest. Usually, parties can break out of a common chat area to form a private chat group.

One difficulty with these methods of facilitating discussions within ad-hoc groups of like-minded individuals is that there is no structure. Taking the example of an automobile repair group, if a highly respected and well-known mechanic is on-line, that individual is likely to be the subject of questions from all directions, and the likelihood is that some of the questions could be easily answered by many of the members of the group. Similarly, if that mechanic does encounter a genuinely difficult issue and "steps aside" into a private chatroom with the questioner, then on returning to the group he or she will be immediately bombarded by questions from all sides.

A further difficulty in such scenarios is that individuals who may perhaps be quieter or less adept at typing quickly, but who nevertheless have considerable expertise to offer, can be overlooked when difficult questions arise, since they never manage to build up their reputations in the same way as perhaps more gregarious members of the group.

One solution intended to provide a more structured approach and to place individuals in contact with experts. As example is the "Google Answers" service (Trademark of Google Inc., available at the website answers.google.com/answers). In this service, participants may pose questions which are posted on the Google Answers site. Participants also post a price which they are willing to pay for a good answer to their question. Professional, pre-approved researchers can elect to conduct the research necessary to provide an answer and thereby be awarded the offered sum of money. In addition, other participants can submit comments in the form of answers, though not for payment. Another example is "Experts Exchange" (see the website www.experts-exchange.com), which is a subscription service. Subscribers can post questions to which a group of designated experts will supply answers, and in addition, subscribers can search the results of previously answered questions.

Websites such as these allow moderators to ensure a degree of quality control over the type of answer received. However, they do not provide real time answers and thus clarification of issues required further exchanges of emails or website posts.

Another environment where groups of individuals share an interest and may need or want to confer with or interact with one another, is in on-line gaming. Traditional off-line games such as chess have always allowed a top-class player to play multiple opponents, often simultaneously. This is more difficult to structure on-line.

In other on-line games, players have to overcome a series of challenges. If there is a particularly difficult challenge, a frustrated player might like to temporarily recruit a more experienced player to take control of the character. Where multi-player games are concerned, that same less experienced player might like to group up with the more experienced player to overcome a challenge.

One currently popular genre of computer game is that known as massively multiplayer on-line role-playing game (MMORPG). Currently popular games of this genre include "World of Warcraft" (trade mark of Blizzard Entertainment, Inc.), "Everquest" (trade mark of Sony Computer Entertainment America Inc.) and "Final Fantasy XI" (trade mark of Square Enix Co., Ltd.). Computer games of this type often encourage players to group together, usually with characters of similar ability level, to defeat a common enemy or to achieve a common goal. Many such games include "chat channels" which allow players to request group members or to offer their services to others. Again, while this is useful, it can be unstructured and can leave shy individuals at a disadvantage.

In many types of game (whether the game is traditional such as poker, chess or bridge, or is a more modern variety such as an MMORPG), certain individuals will often be valued opponents or valued allies. In chess, there is great value in playing against and potentially defeating a high-level opponent. In bridge, there is very little value for a good player to join a random grouping including bad players who do not follow complex conventions on bidding and conduct. In poker, players will want to play with players of similar abilities and resources (more particularly players want to avoid unscrupulous opponents who may pretend to be worse than they really are in order to take advantage of lower level opponents). In each example, therefore, opponents of a given level can be seen as resources which need to be allocated fairly, in much the same way as the knowledgeable mechanic's time in an on-line chatroom might be viewed as a resource which needs to be fairly distributed.

The invention provides a method of managing a communications system of the type in which a number of participants are in communication with the system and in which individual participants can be placed in contact with one another. The method involves the following steps:

a) assigning to each of a number of participants an agent profile according to which contact requests may be assigned to that participant in the capacity of an agent;

b) receiving, from a first of those participants, a contact request having details according to which a match can be made with the agent profiles;

c) assigning the contact request to a queue based on its content;

d) determining a match between the contact request and a second participant, the match being made by assigning the requests in the queue among a group of participants having suitable agent profiles; and e) offering to that second participant the opportunity to respond to the contact request.

It will be appreciated that rather than providing an unstructured environment (such as a free-for-all discussion forum), the method of the invention provides a way for a group of interested participants to respond to requests submitted by one another. Participants are selected to provide a response based on their "agent profile".

Accordingly, taking the example of a difficult question in an automobile repair group, such a question will be queued to a group of participants whose profiles indicate that they have competence to deal with that particular issue, rather than simply posing the question in public for anyone to respond to.

While the method has some superficial similarities to contact centers and call centers, a crucial difference is that such contact centers rely on an available group of dedicated agents employed by the contact center to answer contact requests on behalf of the contact center organisation. In contrast, the present method provides a structured way for participants to answer one another's questions and queries. Individuals who are first-time participants in the communication system can be selected (based on their profile) to answer questions, or they can submit questions to other participants without having any foreknowledge of the personality or abilities of other participants.

It is envisaged that some participants may not be fully active within the system, i.e. may not have assigned agent profiles. This may particularly be true of novice participants for whom a profile has not yet been built up of whose level of expertise is deemed to be too low.

Similarly, the method does not exclude systems where there are a number of dedicated agents in addition to the participants for whom agent profiles are maintained.

Preferably, the method further involves the step of placing the first and second participants in contact with one another if the second participant accepts the offer in step (e).

In this way, the participant (the "first participant") can submit a query or a request for assistance, for example, to the communications system. This "contact request" is analysed to determine the attributes required for an agent to respond to it, and it is placed in a queue. If there are no waiting contact requests, it is of course dealt with immediately as being the top item in the queue. The request is then matched against the next available agent with the best profile to respond to the request and the request is offered to that participant in his or her capacity as an agent. If that second participant chooses to accept the request, then the system will automatically place the first and second participants in contact with one another.

Preferably, the method further involves the step of evaluating the outcome of the communication between the first and second participants and updating the agent profile of the second participant according to the evaluation.

In this way, the agent profiles of the various participants who respond to queries can be dynamically updated to increase or decrease the deemed level of competence in a particular area, or to add to or detract from the areas which the participant is deemed to have some competence. The profile can also be updated with statistical information arising from the contact request which was handled, and further information can be added based on feedback submitted by the first or second participant following the completion of the contact.

The method may further include repeating steps (d) and (e) to identify an alternative participant, different to the second participant, if the second participant declines the offer in step (e).

Preferably, in such cases, the method further involves the step of updating the agent profile of the second participant in response to the second participant declining the offer in step (e).

It is envisaged that if a participant has a particularly "attractive" agent profile in a given area of expertise, making it more likely that that agent will be selected for responding to requests, then a series of refusals to respond to such requests may lead to the agent profile for that particular participant being downgraded, thereby making it less likely that further requests will be offered to that participant as an agent.

Of course, if the alternative participant accepts the offer when step (e) is repeated, then the first and alternative participants may be placed in contact with one another.

In such cases, furthermore, the method will preferably involve the step of evaluating the outcome of the communication between the first and alternative participants and updating the agent profile of the alternative participant according to the evaluation.

The method may further include updating the agent profile of the first participant in response to the contact request submitted by the first participant.

Thus, a participant who submits queries in a particular area of interest may have this area of interest added as an area of expertise in their agent profile. Conversely, a more sophisticated evaluation system may analyse the questions submitted by a participant and may judge that participant to have a particularly low level of expertise, modifying the agent profile accordingly.

The step of assigning an agent profile can be carried out by receiving from a participant a presence notification which includes information enabling said agent profile to be assigned to said participant.

Presence is a concept allowing a party involved in communications (known as a presentity) to notify others (known as watchers) of the availability of the presentity to participate in calls etc. However, presence notifications can also be used to impart other information about the current status of the party.

In this case it is envisaged that presence may be used to signal the participant's abilities to the system which manages the requests and queues.

Furthermore, the method can involve the step of determining the availability of a participant to act as an agent by receiving a presence notification from the participant indicating its availability.

Optionally, the step of determining availability comprises receiving the presence notification and determining that said participant is available to act as an agent in respect of a limited subset of activities.

Thus, a participant could signal availability to act as an agent in respect of some particular subject-matter only.

Preferably, in step (d), the assignment of requests in the queue among a set of participants whose agent profiles are matched with the queue comprises determining a match based on semantic information regarding the request and/or the agent profiles.

Thus, an agent profile specifying an ability to handle queries about the programming language C++ could be semantically matched with a queue for handling object oriented programming queries. By referring to semantic information defining the "meaning" of certain abilities, agent profiles and queues do not necessarily need to abide by one single classification system, making the system more universal and less proprietary.

The invention also provides a communications system comprising:
 a) a network connection via which a plurality of participants may enter into communication with the system;
 b) a conference facility whereby the participants in communication with the system may be placed in communication with one another;
 c) an agent profile store for storing, for each participant, an agent profile according to which contact requests may be assigned to the participant in the capacity of an agent;
 d) a contact request submission facility for receiving from a first participant a contact request having details according to which a match can be made with the agent profiles;
 e) a plurality of queues for storing contact requests based on the content of the contact requests;
 f) a queue manager for assigning the requests in each queue among a group of participants whose agent profiles are matched with the queue, and thereby determining a match between the contact request and a second participant selected from the group and different to the first participant, and for offering to the second participant the opportunity to respond to the contact request.

In one preferred embodiment, the communications system forms part of a gaming system.

Preferably, in such circumstances, the agent profile reflects the abilities of the participants in a game hosted on the gaming system.

In another preferred embodiment, the communications system is an expert forum relating to a specified area of expertise and the queues relate to defined sub-areas within that area of expertise.

In a further aspect, the invention provides a computer program product comprising instructions which when executed by a computer in a communications system are effective to cause the communications system to:
 a) assign to each participant an agent profile according to which contact requests may be assigned to the participant in the capacity of an agent;
 b) receive, from a first participant, a contact request having details according to which a match can be made with the agent profiles;
 c) assign the contact request to a queue based on the content of the contact request;
 d) determine a match between the contact request and a second participant different to the first participant by assigning the requests in the queue among a group of participants whose agent profiles are matched with the queue, whereby second participant is selected from the group; and
 e) offer to the second participant the opportunity to respond to the contact request An embodiment of the invention will now be described, by way of example, with reference to the accompanying drawings, in which:

Figure 1:
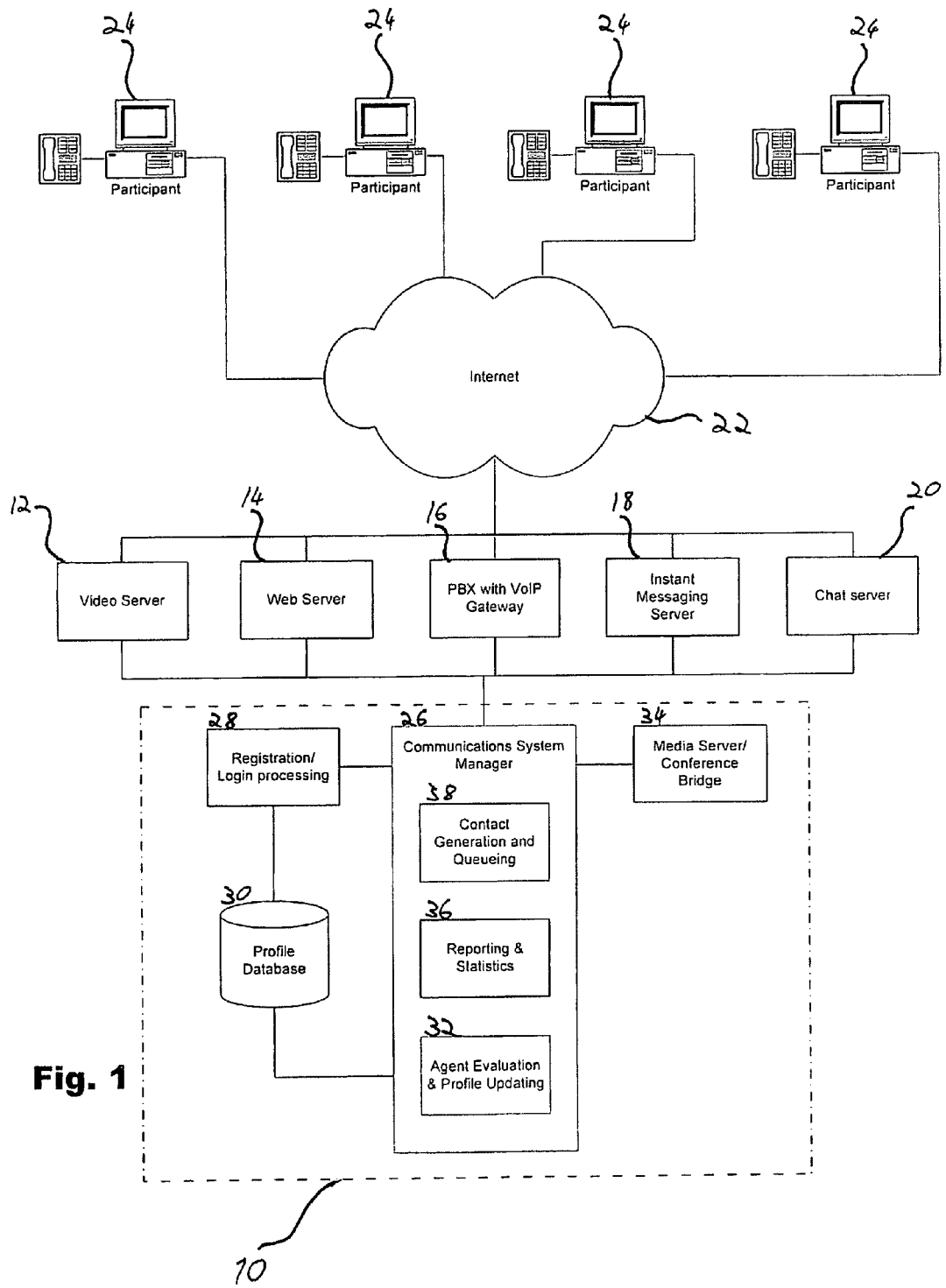
FIG. 1 is a block diagram illustrating the architecture of a communications system according to the invention connected to a plurality of participants via the Internet.

In FIG. 1 there is indicated, generally at 10, a communications system according to the invention which communicates with a number of servers (video server 12, web server 14, PBX 16 (a private branch exchange with a voice over Internet protocol gateway), instant messaging server 18 and chat server 20). Each of these servers is connected to the Internet 22, whereby remotely distributed participants 24 can each communicate with the various servers and thereby with the communications system 10.

The system and method will be primarily described with reference to participants who connect to a website hosted by web server 14. Although shown as separate servers, such websites will often provide integrated video, voice, instant messaging and chat functions. It is therefore not unusual for participants to enter into a discussion site purely on a web page and then to engage other users in some other media, such as a combined video/voice session or a text chat session.

In any event, when a participant 24 accesses the web server 14, a communications system manager 26 notes the new connection and connects the participant 24 to a registration/login process 28. Access to this process is achieved by the web server serving a suitable login/registration page in known manner.

On first accessing the communications system, a participant is directed through a registration procedure in which details of the interests and abilities of that participant are detailed as far as possible. Thus, for example, on an automotive repairs discussion system, users might rate their knowledge from 1 to 5 in a range of areas, including engines, transmissions, electrical systems, tires, etc., by brand, or by subtopic. The system can then store a beginning profile for that user in a profile database 28. Returning users who log into the system cause allow the existing profile to be retrieved from the profile database 28.

To further illustrate the system, reference is additionally made to FIG., 2, which shows the process beginning with a participant, having the chosen user name "MechExpert", logging into the system. When MechExpert accesses the login/registration page, step 100, a check is made in step 102 as to whether that user already exists in the database 30. If so, the profile is retrieved from the database, step 104, and if not, a profile is generated through a registration form in known manner, step 106.

Once the profile has been generated or retrieved, the profile is added to a set of active agent profiles, step 108. In one embodiment, all participants in the system will be active agents. In other embodiments, certain participants (who are outside the scope of the method of the invention) are passive participants, i.e. they are never treated as active agents. For simplicity, in the described embodiment it is to be assumed that every participant can be an active agent.

The status of this agent profile is initially set with an "IDLE" flag, step 110. At this point, MechExpert is logged into the system and can browse the resources of the site, participate in general discussion, and so forth. However, as an active participant in the site, MechExpert can also generate a request for a contact, which in the context of an automobile repair discussion system, would generally be a question about automobile repair, step 112, or MechExpert can be selected, on the basis of the agent profile stored for MechExpert, to handle a contact request from another participant, step 114.

When MechExpert generates a contact request, step 112, the process proceeds as will be described below in relation to FIG. 3. When MechExpert is offered a contact in his capacity as an agent, step 114, a choice is provided, step 116, either to accept or reject the contact. If the contact offered is accepted, the process proceeds as will be described below in relation to FIG. 4. If the contact offer is rejected, an agent evaluation and profile updating module 32 updates the agent profile for MechExpert in accordance with predetermined rules which specify the effect on an agent profile of rejecting a contact, step 118.

Figure 3:
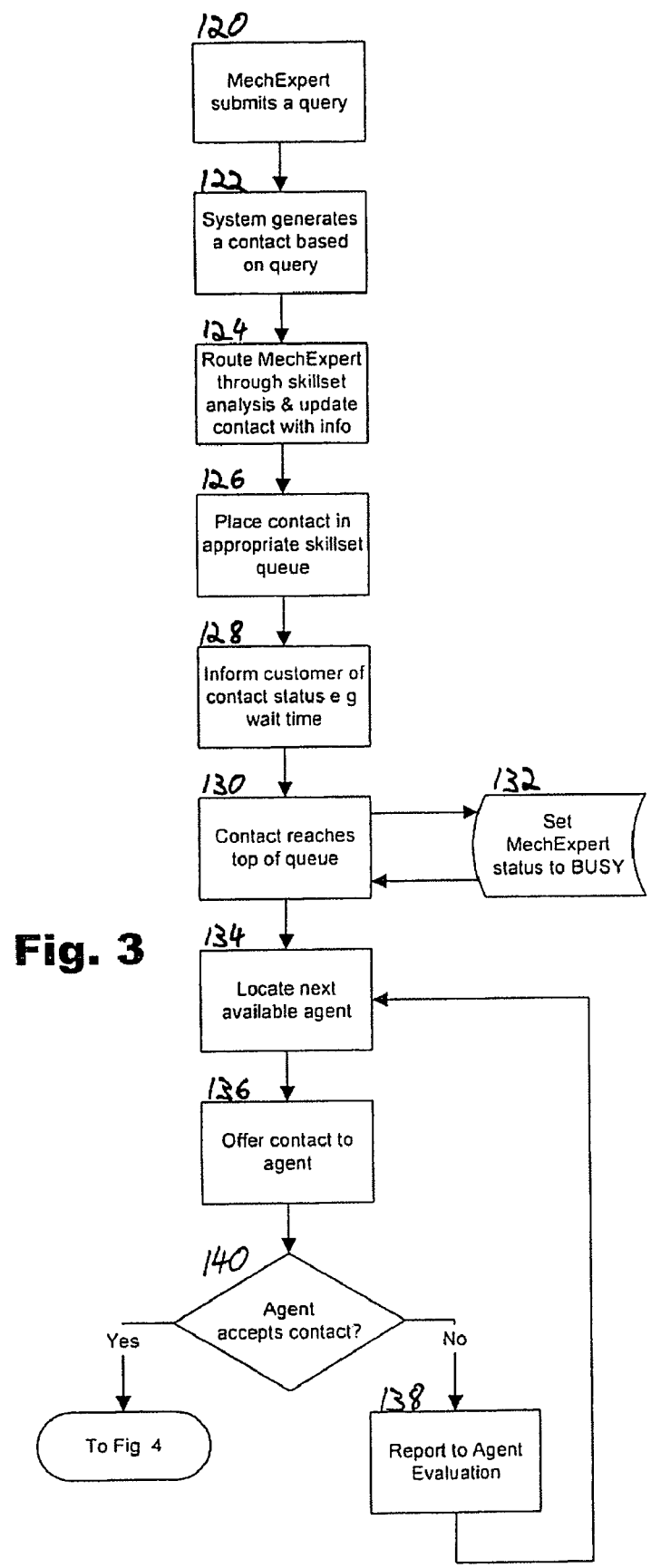
FIG. 3 is a flowchart illustrating the generation and routing of a contact request according to the method of the invention.

FIG. 3 describes how the process proceeds when MechExpert submits a query, step 120. The system generates a contact based on this query. The contact will include details of the requester and details of the skill sets required to properly service the contact, in so far as can be determined from the content of the submitted query. If there is insufficient information, then MechExpert may be routed through a further query process (not shown) to generate sufficient information to allow it to be properly assigned to an agent. The contact generation is shown as step 122 and the optional further analysis is shown as step 124.

Based on the information which has been gleaned regarding the contact, the contact is placed in an appropriate skill set queue, step 126. In the example given of an automotive repair website, the queues may include "engines", "transmissions", etc. The level of granularity may be higher, and multiple skill sets may be involved in queuing contacts. Thus, for example, a contact might have all of the skill sets "engines", "starter motors", "Toyota Landcruiser" and "four wheel drive vehicles". (Toyota Landcruiser is a Trademark of Toyota Motor Corporation.)

In the illustrated system, the optional step 128 can be provided of informing MechExpert of the status of the contact, i.e. that it is queued in a particular queue with a given wait time.

When the contact reaches the top of the queue, step 130, the status of MechExpert is set to "BUSY", step 132, as it is envisaged that from this point on MechExpert is to be available to be placed in contact with another participant having a suitable agent profile to deal with the contact. The next available agent for that queue is located, step 134, and the contact is offered to that agent, step 136.

Figure 2:
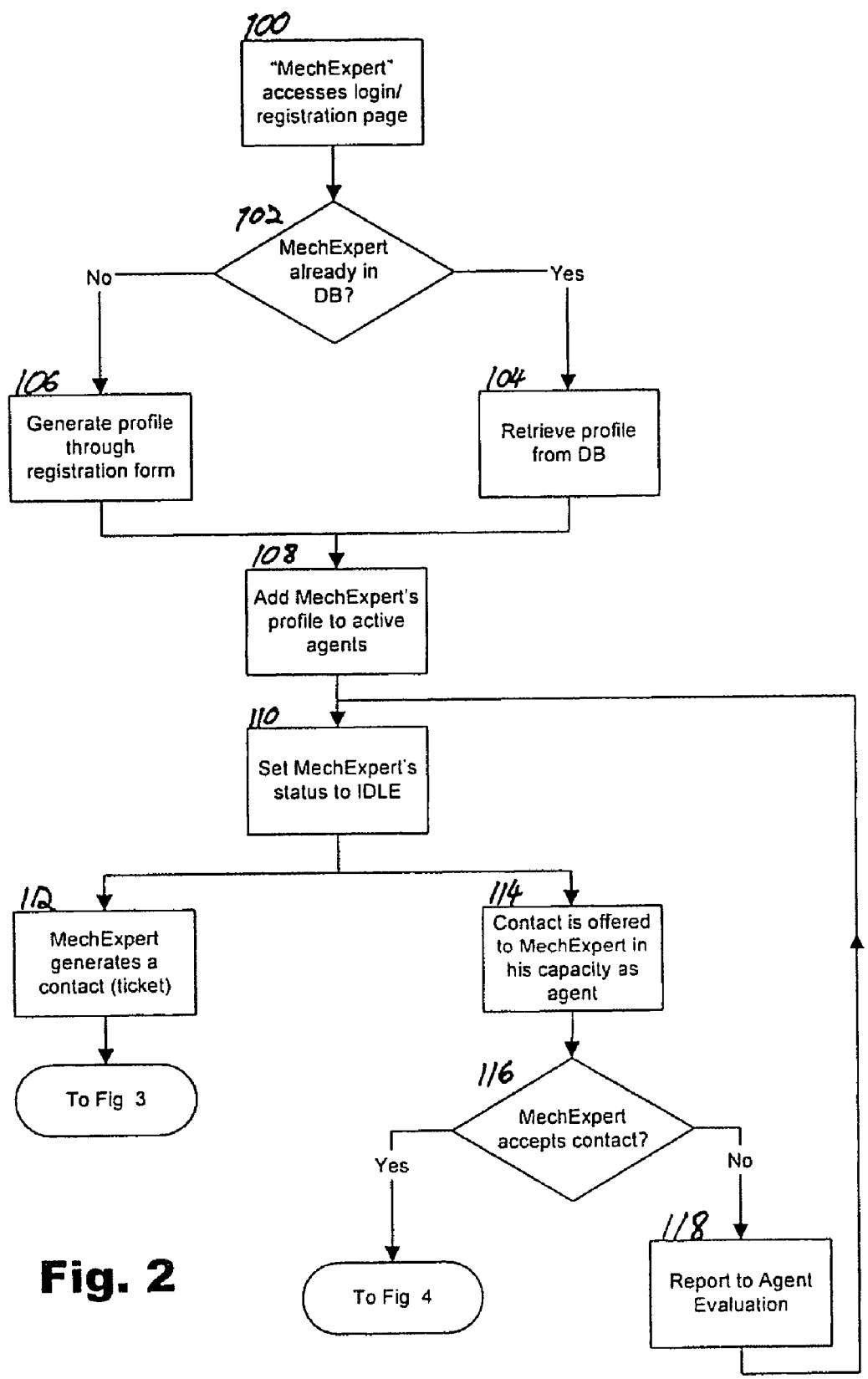
FIG. 2 is a flowchart illustrating the initial stages of a method according to the invention.

As was illustrated in relation to FIG. 2, the agent is presented with a choice, step 140. The agent can either accept the contact, in which case processing proceeds according to FIG. 4, or can reject the contact in which case this is noted, step 138, in the agent evaluation module 32 and the process reverts to step 134, i.e. the next most suitable available agent is located. This proceeds until an agent has accepted the contact.

Figure 4:
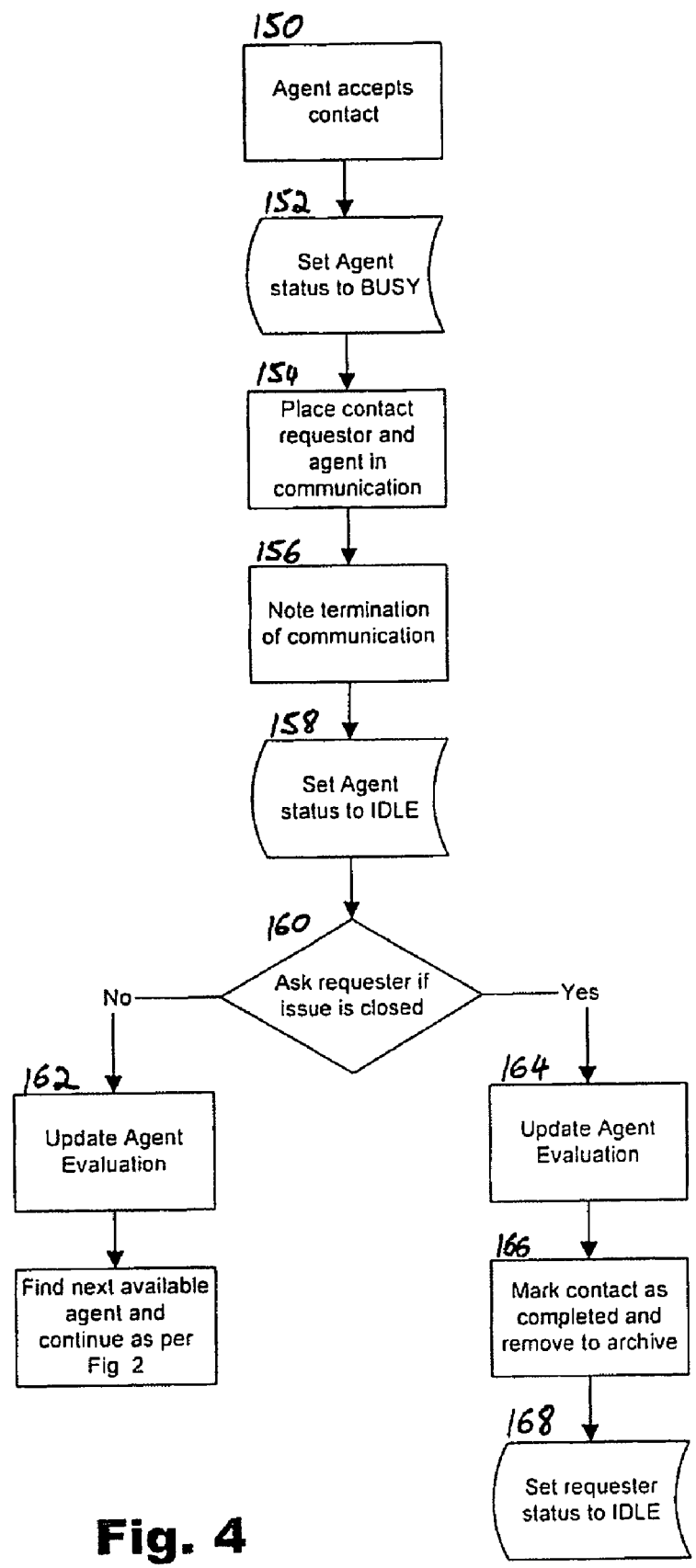
FIG. 4 is a flowchart illustrating further steps in the method of the invention.

Turning now to FIG. 4, when an agent accepts the contact, step 150, the agent's status is set to "BUSY", step 152. At this point, both the requester and the agent will have the BUSY status. In step 154, the contact requester and agent are placed in communication. Reverting momentarily to FIG. 1, it can be seen that a media server/conference bridge 34 is provided in the communications system. This media server 34 allows the voice and video streams from the first participant (who initiated the contact request) and the voice and video streams from the second participant (who has accepted the contact offer) to be placed in conference with one another so that direct communication can ensue between the first and second participants. The skilled person will appreciate that there are numerous methods known in the art of placing two incoming communications channels in communication with one another and the invention is by no means limited to the use of a media server or conference bridge.

At some point, the two parties will cease communicating with one another and the communications system manager 26 will note the termination of the communication, step 156. Details of the communication are noted and recorded by a reporting and statistics module 36.

The agent's status is set to IDLE once the communication had been terminated, step 158. In step 160, the requester is then prompted to indicate whether the issue has been closed, i.e. dealt with satisfactorily by the second participant who acted as agent in this instance. If the first participant indicates that the issue is not closed, then this can be noted by the agent evaluation module 32 which will typically adjust the profile for that second participant, step 162, to make it less likely that such requests are routed to him or her in the future. The process then finds the next available agent as shown in FIG. 3 at step 134 and continues from there using a further participant as an agent.

If the requester indicates that the issue is closed, then the agent evaluation 32 is updated with a positive indication, step 164, and the contact is marked as completed and moved to an archive, step 166. The requester status can then be set to IDLE, step 168, given that the issue has been dealt with and closed and that this participant is now free to submit further contact requests and/or answer contact requests routed to it by the contact generation and queuing manager 38.

The invention is not limited to the embodiments described herein which may be varied or modified without departing from the scope of the claimed invention.

We claim:

1. A method of managing a communications system of the type wherein a plurality of participants are in communication with the system and wherein individual participants can be placed in contact with one another, said method comprising the steps of:
   a) assigning to each of a plurality of participants an agent profile according to which contact requests may be assigned to said participant in the capacity of an agent;
   b) receiving, from a first of said plurality of participants, a contact request having details according to which a match can be made with said agent profiles;
   c) placing said contact request in a queue of contact requests based on the content of the contact request;
   d) determining a match between said contact request and a second of said plurality of participants different to the first participant by assigning the contact requests in said queue among a set of participants whose agent profiles are matched with said contact requests of said queue, whereby said second participant is selected from said set; and e) offering to said second participant the opportunity to respond to said contact request.

2. A method as claimed in claim 1, further comprising the step of placing said first and second participants in contact with one another if the second participant accepts the offer in step (e).

3. A method as claimed in claim 2, further comprising the step of evaluating the outcome of the communication between the first and second participants and updating the agent profile of the second participant according to said evaluation.

4. A method as claimed in claim 3, further comprising the step of placing said first and alternative participants in contact with one another if the alternative participant accepts the offer in step (e).

5. A method as claimed in claim 4, further comprising the step of evaluating the outcome of the communication between the first and alternative participants and updating the agent profile of the alternative participant according to said evaluation.

6. A method as claimed in claim 1, further comprising repeating steps (d) and (e) to identify an alternative participant, different to the second participant, if the second participant declines the offer in step (e).

7. A method as claimed in claim 6, further comprising the step of updating the agent profile of the second participant in response to the second participant declining the offer in step (e).

8. A method as claimed in claim 1, further comprising the step of updating the agent profile of the first participant in response to the contact request submitted by the first participant.

9. A method as claimed in claim 1, wherein the step of assigning an agent profile comprises receiving from a participant a presence notification which includes information enabling said agent profile to be assigned to said participant.

10. A method as claimed in claim 1, further comprising the step of determining the availability of a participant to act as an agent by receiving a presence notification from said participant indicating said availability.

11. A method as claimed in claim 10, wherein said step of determining availability comprises receiving said presence notification and determining that said participant is available to act as an agent in respect of a limited subset of activities.

12. A method as claimed in claim 1, wherein in step (d), the assignment of requests in said queue among a set of participants whose agent profiles are matched with said queue comprises determining a match based on semantic information regarding the request and/or the agent profiles.

13. A communications system comprising:
   a) a network connection via which a plurality of participants may enter into communication with the system;
   b) a conference facility whereby said participants in communication with the system may be placed in communication with one another;
   c) an agent profile store for storing, for each participant, an agent profile according to which contact requests may be assigned to said participant in the capacity of an agent;
   d) a contact request submission facility for receiving from a first participant a contact request having details according to which a match can be made with said agent profiles;
   e) a plurality of queues for storing contact requests based on the content of the contact requests;
   f) a queue manager for assigning the requests in each queue among a set of participants whose agent profiles are matched with said contact requests in said queue, and thereby determining a match between said contact request and a second participant selected from said set and different to the first participant, and for offering to said second participant the opportunity to respond to said contact request.

14. A communications system as claimed in claim 13, wherein said communications system forms part of a gaming system.

15. A communications system as claimed in claim 14, wherein said agent profiles reflect the abilities of said participants in a game hosted on said gaming system.

16. A communications system as claimed in claim 13, wherein said communications system is an expert forum relating to a specified area of expertise and wherein said queues relate to defined sub-areas within said area of expertise.

* * * * *